US009581228B2

(12) United States Patent
Nashery et al.

(10) Patent No.: US 9,581,228 B2
(45) Date of Patent: Feb. 28, 2017

(54) CAM APPARATUS FOR USE WITH VALVES (71) Applicant: Emerson Process Management Regulator Technologies, Inc., McKinney, TX (US)

(72) Inventors: Khashayar Afnan Nashery, Dallas, TX (US); Ernesto Vasquez, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 130 days.

(21) Appl. No.: 14/506,233

(22) Filed: Oct. 3, 2014

(65) Prior Publication Data
US 2016/0097444 A1    Apr. 7, 2016

(51) Int. Cl.
| F16K 31/44 | (2006.01) |
| F16H 53/02 | (2006.01) |
| F16K 1/34 | (2006.01) |
| F16K 39/02 | (2006.01) |
| F16K 3/18 | (2006.01) |
| F16K 3/20 | (2006.01) |
| F16K 31/52 | (2006.01) |
| F16K 31/524 | (2006.01) |

(52) U.S. Cl.
CPC .............. *F16H 53/02* (2013.01); *F16K 1/34* (2013.01); *F16K 31/52408* (2013.01);
(Continued)

(58) Field of Classification Search
CPC ...... F16K 1/34; F16K 31/52408; F16K 31/52; F16K 31/523; F16K 31/524; F16K 3/184; F16K 3/205; F16H 53/02
(Continued)

(56) References Cited

U.S. PATENT DOCUMENTS 3,631,893 A * 1/1972 Seaman ................ F16K 17/168
137/517
3,807,442 A   4/1974 Sumner et al.
(Continued)

FOREIGN PATENT DOCUMENTS

DE        1208575       1/1966
JP        2013185661    9/2013

OTHER PUBLICATIONS

Emerson Process Management Regulator Technologies, "Type C407-10 Internal Valves," Instruction Manual, Sep. 2013, 12 pages.
(Continued)

*Primary Examiner* — R. K. Arundale
*Assistant Examiner* — Kelsey Rohman
(74) *Attorney, Agent, or Firm* — Hanley, Flight & Zimmerman, LLC (57) ABSTRACT Cam apparatus for use with valves are disclosed. An example apparatus includes a cam having a cam surface to engage a valve stem, a first portion of the cam surface to engage the valve stem in a closed position, a second portion of the cam surface to engage the valve stem in an open position, and a third portion of the cam surface adjacent the first portion and defining a curved profile. The third portion is to engage the valve stem when the cam is rotated to a first intermediate position between the closed position and the open position. The example apparatus also includes a fourth portion of the cam surface between the second portion and the third portion and defining a linear profile. The fourth portion is to engage the valve stem surface as the cam rotates between the first intermediate position and the open position.

20 Claims, 9 Drawing Sheets (52) U.S. Cl.
CPC ............ *F16K 39/024* (2013.01); *F16K 3/184* (2013.01); *F16K 3/205* (2013.01); *F16K 31/52* (2013.01); *F16K 31/523* (2013.01); *F16K 31/524* (2013.01)

(58) Field of Classification Search
USPC .......................... 251/251, 252, 253, 254, 256
See application file for complete search history.

(56) References Cited

U.S. PATENT DOCUMENTS

| | | | | |
|---|---|---|---|---|
| 4,250,923 | A | * | 2/1981 | Johnson ............ F16K 31/52483 |
| | | | | 137/625.69 |
| 2010/0084029 | A1 | | 4/2010 | Lin et al. |
| 2010/0252770 | A1 | * | 10/2010 | Lin ......................... F16K 1/385 |
| | | | | 251/333 |
| 2013/0056666 | A1 | * | 3/2013 | Lin ......................... F16K 1/126 |
| | | | | 251/291 |

OTHER PUBLICATIONS

Patent Cooperation Treaty, "Written Opinion of the International Searching Authority," issued in connection with International application No. PCT/US2015/053637, dated Jan. 27, 2016, 6 pages.
Patent Cooperation Treaty, "International Search Report," issued in connection with International application No. PCT/ US2015/ 053637, dated Jan. 27, 2016, 5 pages.

\* cited by examiner

CAM APPARATUS FOR USE WITH VALVES

FIELD OF THE DISCLOSURE

This patent relates generally to cam apparatus and, more particularly, to cam apparatus for use with valves.

BACKGROUND

Internal valves are commonly used in a variety of commercial and industrial applications to control fluid flow between fluid storage containers (e.g., hoses, pipelines, containers, etc.). Some internal valves include a poppet that controls fluid flow through the internal valve by preventing fluid flow when in a closed position and enabling fluid flow when in an open position. In some instances, the poppet of the internal valve is coupled to a stem that moves along a rectilinear path to actuate the poppet between the open position and the closed position. Some internal valves include a rotating cam to transform rotational movement of a shaft into linear movement of the stem.

SUMMARY

In one example, an apparatus includes a cam having a cam surface to engage a valve stem, a first portion of the cam surface to engage the valve stem in a closed position, a second portion of the cam surface to engage the valve stem in an open position, and a third portion of the cam surface adjacent the first portion and defining a curved profile. The third portion to engage the valve stem when the cam is rotated to a first intermediate position between the closed position and the open position. The apparatus also includes a fourth portion of the cam surface between the second portion and the third portion and defining a linear profile. The fourth portion is to engage the valve stem surface as the cam rotates between the first intermediate position and the open position.

In another example, an apparatus includes a valve body defining a chamber and a gland, a stem extending into the chamber of the valve body, and a shaft disposed in the gland of the valve body such that a seal is formed between the shaft and the gland. The shaft has an end that extends into the chamber of the valve body adjacent the stem. The apparatus also includes a cam coupled to the end of the shaft and defining an outer surface to engage an end of the stem. The outer surface has a first portion to engage the end of the stem in a closed position, a second portion to engage the end of the stem in an open position, a third portion adjacent the first portion and defining a curved profile that is to engage the end of the stem in a first intermediate position, and a fourth portion between the second portion and the third portion and defining a linear profile that is to engage the end of the stem in a second intermediate position.

In another example, an apparatus includes means for transforming rotary motion to linear motion, means to engage a stem in a closed position defined by the means for transforming, means to engage the stem in an open position defined by the means for transforming, and means to engage the stem in a first intermediate position as the means for transforming rotates between the closed position and the open position. The means to engage the stem in the first intermediate position defines a curved profile and is adjacent the means to engage the stem in the closed position. The apparatus also includes means to engage the stem in a second intermediate position as the means for transforming rotates between the first intermediate position and the open position. The means to engage the stem in the second intermediate position defines a linear profile and is positioned between the means to engage the stem in the open position and the means to engage the stem in the closed position.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Many known internal valves employ a cam to translate rotational movement of a shaft to linear movement of a stem. The linear movement of the stem adjusts a size of an opening of the internal valve to control fluid flow through the internal valve. For example, in a closed position, the stem causes a plug to engage a poppet and causes the poppet to engage a body of the internal valve to prevent fluid from flowing through the internal valve. In an open position, the stem causes the poppet to disengage from the surface of the body to enable fluid to flow freely through the internal valve.

Many known internal valves are installed in low temperature (e.g., −40 degrees Celsius) and/or low pressure environments. In some such examples, the internal valve employs a gland through which the shaft extends and employs spacers positioned within the gland to form a seal between the shaft and the seal. The spacers are sized ensure that the seal is formed between the gland and the shaft in low temperature and/or low pressure environments such that packing forces are created within the gland that resist and/or obstruct rotation of the shaft. As a result, the spacers within the gland may prevent the shaft from rotating to the closed position which, in turn, prevents the poppet from forming a seal with the body of the internal valve and enables fluid to leak through the internal valve.

The example cam disclosed herein enables a shaft to overcome packing forces created by spacers within a gland and, thus, enables a poppet to form a tight seal with a body of an internal valve in a closed position. As a result, the example cam prevents fluid from leaking through the internal valve in the closed position when the internal valve is installed in low temperature and/or low pressure environments.

An example cam defines an outer surface to engage an end of a valve stem. For example, the outer surface has a first portion that is to engage the end of the valve stem in a closed position and has a second portion that defines a linear profile and is to engage the end of the valve stem in an open position. The outer surface of the example cam may have a third portion adjacent the first portion that defines a curved profile and is to engage the end of the valve stem in a first intermediate position. In some examples, the curved profile of the first intermediate surface causes angular acceleration of the cam as the cam rotates between the first portion and the fourth portion which, in turn, causes the valve stem to accelerate along a rectilinear path. The angular acceleration of the cam enables the shaft to overcome the packing forces within the gland and, thus, enables the poppet to form a tight or shut-off seal with the body when the internal valve is in the closed position. For example, the outer surface of the example cam has a fourth portion between the second portion and the third portion that defines a linear profile and is to engage the end of the valve stem in a second intermediate position. In some examples, the linear profile of the fourth portion enables the example cam to rotate from the open position by enabling the second portion to disengage from the end of the valve stem.

Figure 1:
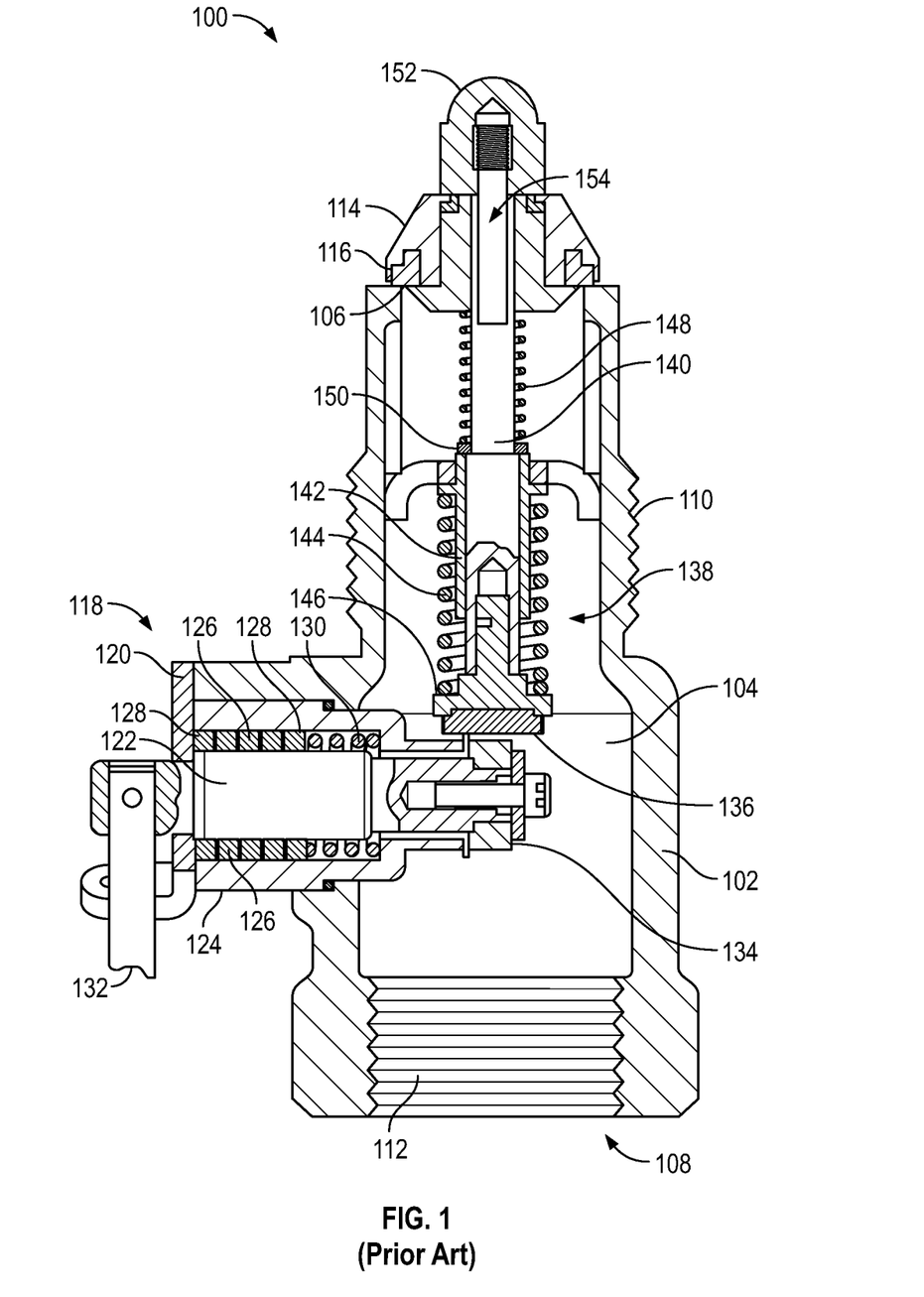
FIG. 1 depicts a cross-sectional view of a known internal valve.

Before discussing the example cam disclosed herein, a brief description of a known internal valve of FIG. 1 and a known cam of FIGS. 2A-2E are provided. FIG. 1 depicts a known internal valve 100 in a closed position that includes a body 102 defining a bore or chamber 104, a first opening 106, and a second opening 108. The body 102 defines exterior threads 110 to engage an opening of a chamber or tank (e.g., a pumping system, a stationary storage tank, a transport truck, etc.) to fluidly couple the chamber or tank to the chamber 104 via the first opening 106. The chamber 104 of the body 102 defines internal threads 112 adjacent the second opening 108 to engage another body (e.g., a coupling of a chamber, a hose, a pipeline, etc.) to fluidly couple the other body to the chamber 104 via the second opening 108. The chamber 104 of the internal valve 100 fluidly couples the chamber or tank coupled to the exterior threads 110 to the other body coupled to the internal threads 112. A poppet 114 of the known internal valve 100 sealingly engages a surface 116 of the body 102 in the closed position to prevent fluid flow through the first opening 106 of the internal valve 100.

A gland assembly 118 is coupled to the body 102 of the internal valve 100 via a plate 120. The gland assembly 118 includes a shaft 122 that is rotatably coupled to a gland 124. The shaft 122 is partially positioned within the gland 124. Spacers 126 positioned within the gland 124 surround the shaft 122 to form a seal between the shaft 122 and the gland 124. The spacers 126 are positioned between washers 128 and a spring 130 disposed within the gland 124.

An external lever 132 is coupled to the shaft 122 to enable the shaft 122 to be rotated relative to the gland 124. As illustrated in FIG. 1, a cam 134 is positioned within the chamber 104 and is coupled to the shaft 122 opposite the external lever 132. Because the cam 134 is coupled to the shaft 122, rotation of the shaft 122 causes rotation of the cam 134. As the cam 134 rotates, the cam 134 engages a surface 136 of a stem assembly 138 to cause movement of the stem assembly 138 along a rectilinear path within the chamber 104.

The stem assembly 138 includes a stem 140 and a stem guide 142 that surrounds a portion of the stem 140. A first spring 144 of the stem assembly 138 is positioned between a first spring seat 146 and the stem guide 142, and a second spring 148 of the stem assembly 138 is positioned between a second spring seat 150 and the poppet 114. A plug 152 is coupled to the stem 140 and engages the poppet 114 in the closed position. The stem 140 extends through an aperture 154 defined by the poppet 114 to couple to the plug 152.

Figure 2A:
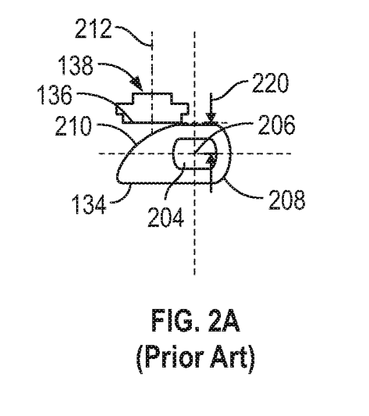
FIGS. 2A-2E depict a side view of a known cam in a closed position, three intermediate positions, and the open position, respectively.
Figure 2B:
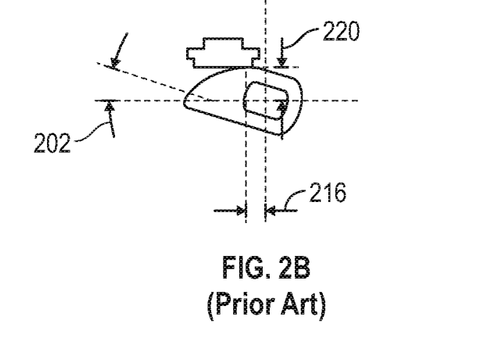
Figure 2C:
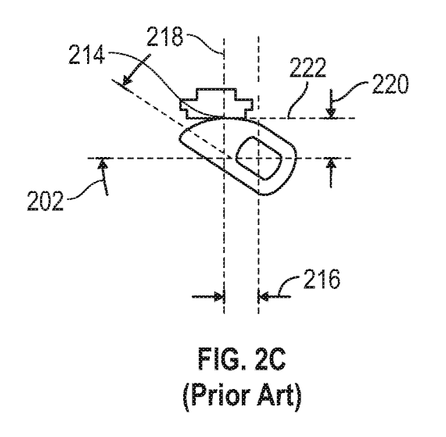
Figure 2D:
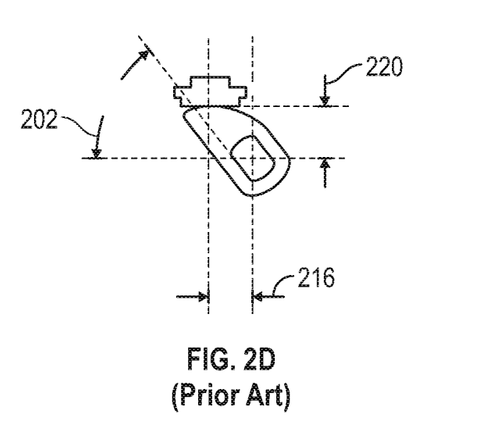
Figure 2E:
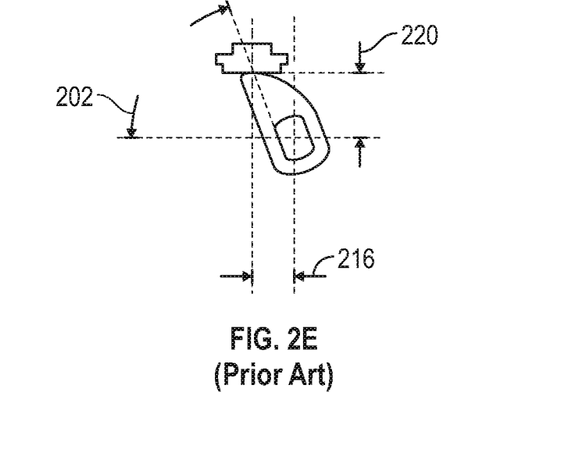

FIGS. 2A-2E show the known cam 134 in various positions as the cam 134 rotates between the closed position and an open position. As shown in FIGS. 2A-2E, the cam 134 is oriented at an angle of rotation 202 relative to the closed position as the cam 134 is rotated from the closed position to the open position. For example, FIG. 2A shows the cam 134 in a closed position, FIG. 2B shows the cam in a first intermediate position (e.g., when the angle of rotation 202 is 17.5 degrees), FIG. 2C shows the cam in a second intermediate position (e.g., when the angle of rotation 202 is 35 degrees), FIG. 2D shows the cam in a third intermediate position (e.g., when the angle of rotation 202 is 52.5 degrees), and FIG. 2E shows the cam in the open position (e.g., when the angle of rotation 202 is 70 degrees).

As shown in FIG. 2A, the known cam 134 defines an aperture 204 to receive the shaft 122. The cam 134 has an axis of rotation 206 defined by a center of the aperture 204. As shown in FIG. 2, an outer surface 208 of the cam 134 defines a curved portion 210 that engages the surface 136 of the stem assembly 138 as the cam 134 rotates about the axis of rotation 206. The outer surface 208 of the cam 134 causes the stem assembly 138 to move in a rectilinear path along a longitudinal axis 212 of the stem assembly 138 as the cam 134 rotates.

The cam 134 engages the surface 136 of the stem assembly 138 at a contact surface 214. As shown in FIG. 2C, the contact surface 214 moves along the curved portion 210 of the outer surface 208 as the cam 134 rotates. A first distance 216 is defined between the axis of rotation 206 and a first axis 218 that extends through the contact surface 214 and is parallel the longitudinal axis 212 of the stem 138. As shown in FIGS. 2A-2E, the first distance 216 varies as the cam rotates between the closed position and the open position. A second distance 220 is defined between the axis of rotation 206 and a second axis 222 that extends through the contact surface 214 and is perpendicular the first axis 218. As the cam 134 rotates from the closed position to the open position, the second distance 220 varies as the cam 134 causes the stem assembly 138 to move away from the axis of rotation 206.

Figure 3A:
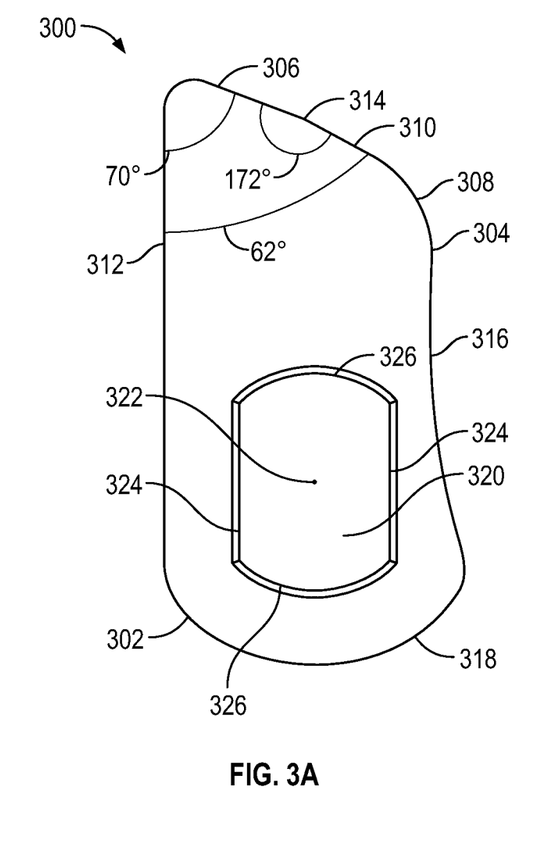
FIG. 3A depicts a side view of an example cam in accordance with the teachings herein.
Figure 3B:
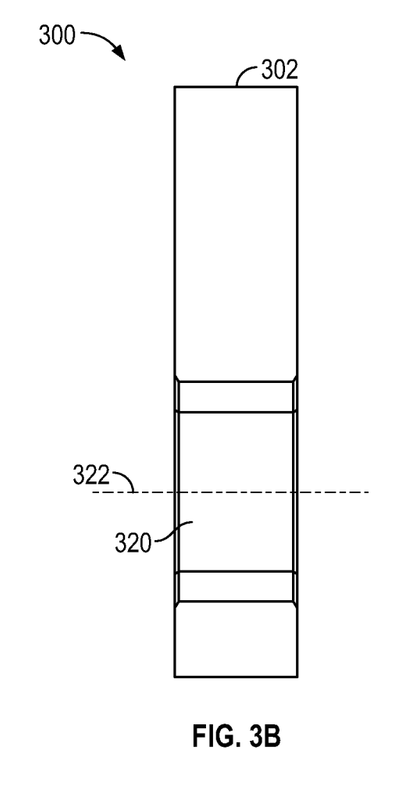
FIG. 3B depicts a cross-sectional view of the example cam of FIG. 3A.

FIGS. 3A and 3B illustrate an example cam 300 in accordance with the teachings herein. The cam 300, for example, is composed of a metal and is formed via a powder metallurgy process such as die pressing. The cam 300 has an outer surface 302 that is to engage a surface (e.g., a surface 404 of FIGS. 4A-4E) of a stem apparatus (e.g., a stem apparatus 406 of FIGS. 4A-4E). As illustrated in FIG. 3, the outer surface 302 has a uniform width as a result of the cam 300 having a uniform thickness. The outer surface 302 includes a first segment or portion 304 that is associated with a closed position and a second segment or portion 306 that is associated with an open position. As illustrated in FIG. 3, the second portion 306 defines a substantially linear profile. In the illustrated example, the outer surface 302 includes a third segment or portion 308 adjacent the first portion 304 and between the first portion 304 and the second portion 306. For example, the third portion 308 defines a curved profile having a significantly smaller radius of curvature than the curved portion 210 of the known cam 134. The curved third portion 308 provides a smooth transition between the first portion 304 and a fourth segment or portion 310 of the outer surface 302. For example, the fourth portion 310 defines a linear profile between the second portion 306 and the third portion 308 of the outer surface 302. The linear profile of the fourth portion 310 is non-parallel and non-perpendicular to the linear profile of the second portion 306.

The outer surface 302 of the illustrated cam 300 includes a fifth segment or portion 312 that defines a linear profile adjacent the second portion 306 opposite the fourth portion 310. An angle of between about 65 and 75 degrees is formed between the linear profile of the second portion 306 and the linear profile of the fifth portion 312, and an angle of between about 57 and 67 degrees is formed between the linear profile of the fourth portion 310 and the linear profile of the fifth portion 312. For example, an angle of about 70 degrees may be formed between the linear profile of the second portion 306 and the linear profile of the fifth portion 312 and an angle of about 62 degrees is formed between the linear profile of the fourth portion 310 and the linear profile of the fifth portion 312, such that an angle of about 172 degrees is formed between the linear profile of the second portion 306 and the linear profile of the fourth portion 310 along an edge 314. The angle formed at the edge 314 between the second portion 306 and the fourth portion 310 of the cam 300 prevents the cam 300 from being jammed and/or locked in an open position (e.g., the position of the cam 300 illustrated in FIG. 4A) and, thus, enables the cam 300 to rotate from the open position. For example, if the second portion 306 and the fourth portion 310 were substantially parallel such that no edge was defined between the second and fourth portions 306, 310, the second and fourth portions 306, 310 would define an extended flat portion that may prevent the cam 300 from rotating from the open position as a stem apparatus (e.g. the stem apparatus 406 of FIG. 4A-4E) applies a force to the cam 300. The above-noted angles are merely one example of the cam disclosed herein and, thus, other angles may be used without departing from the scope of this disclosure.

As illustrated in FIG. 3A, the outer surface 302 includes a sixth segment or portion 316 opposite the fifth portion 312 and adjacent the first portion 304 which, in the illustrated example, defines a curved, concave profile. As illustrated in FIG. 3A, a seventh segment or portion 318 of the outer surface 302 forms a curved, convex profile and is positioned between the fifth portion 312 and the sixth portion 316.

Figure 4A:
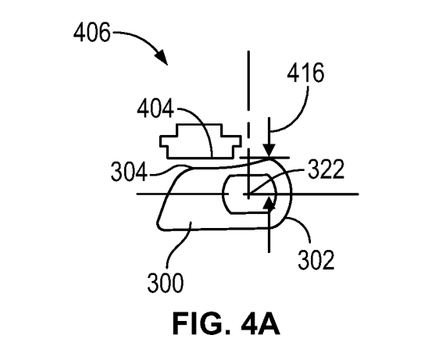
FIGS. 4A-4E depict a side view of the example cam of FIGS. 3A-3B in a closed position, three intermediate positions, and the open position, respectively.
Figure 4B:
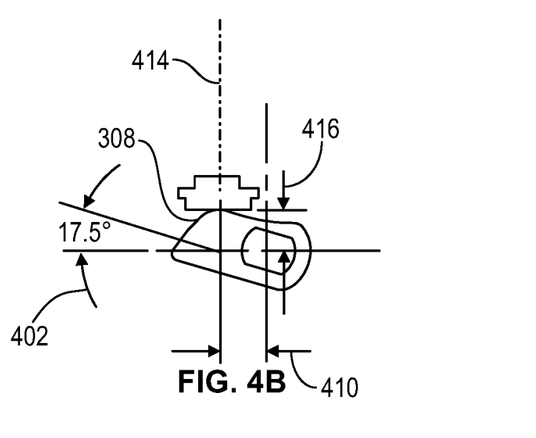
Figure 4C:
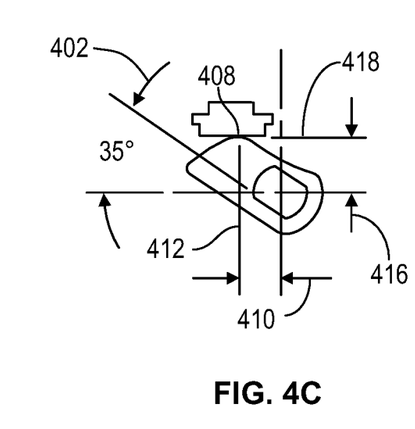
Figure 4D:
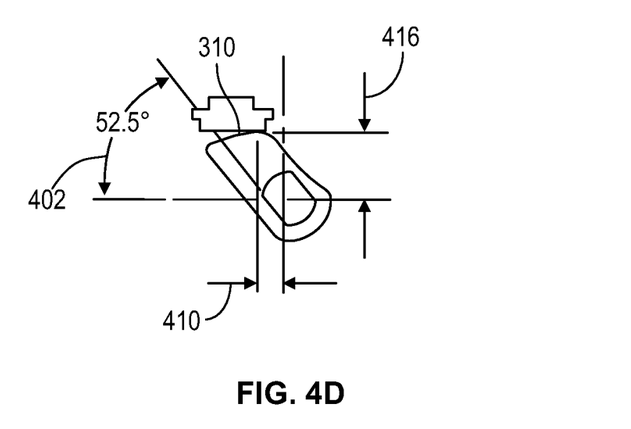
Figure 4E:
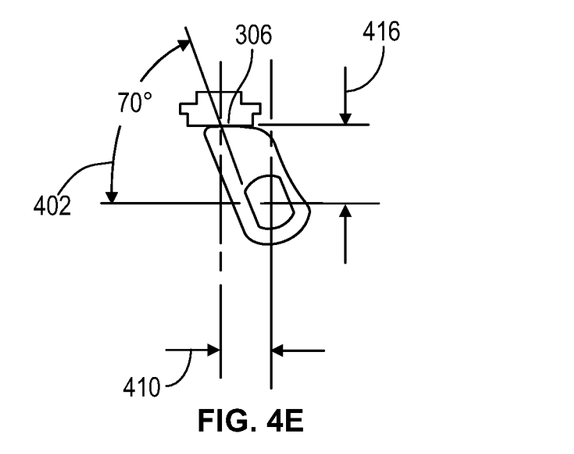
Figure 5:
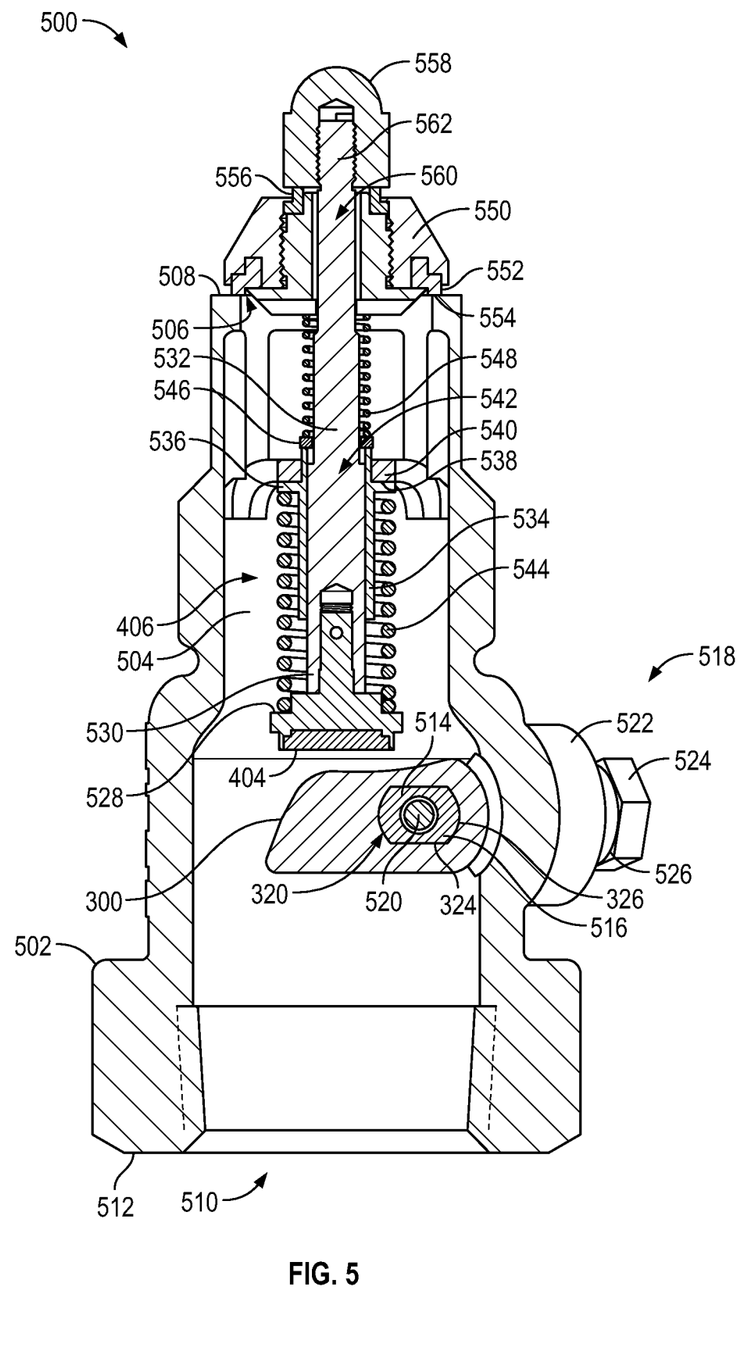
FIG. 5 depicts a cross-sectional view of an example internal valve and the example cam of FIGS. 3A-4E in the closed position.

The cam 300 of FIGS. 3A-3B defines an aperture 320 that is to receive a shaft (e.g., a shaft 516 of FIG. 5). The center of the aperture 320 is to align with a longitudinal axis of the shaft and defines an axis of rotation 322 of the cam 300. As illustrated in FIGS. 3A-3B, the axis of rotation 322 is offset from the center of mass of the cam 300. Because the axis of rotation 322 is offset from the center of mass, the cam 300 is an eccentric cam that causes a stem apparatus (e.g., the stem apparatus 406 of FIGS. 4A-4E) engaging the outer surface 302 of the cam 300 to actuate as the cam 300 rotates about the axis of rotation 322. As illustrated in FIG. 3A, the aperture 320 of the cam 300 defines a profile that enables the aperture 320 to act as a key to position the cam 300 in a desired orientation relative to a shaft (e.g., the shaft 516 of FIG. 5). For example, the aperture 320 of the cam 300 defines two opposing linear edges 324 and two opposing curved edges 326 between the two linear edges 324.

FIGS. 4A-4E illustrate the cam 300 in various positions as the cam 300 rotates between a closed position at which fluid is prevented from flowing through an internal valve (e.g., an internal valve 500 of FIG. 5) and an open position at which fluid is permitted to flow through the internal valve. The cam 300 is oriented at an angle 402 relative to the closed position as the cam 300 rotates from the closed position to the open position. For example, FIG. 4A illustrates the cam 300 in the closed position, FIG. 4B illustrates the cam 300 in a first intermediate position, FIG. 4C illustrates the cam 300 in a second intermediate position, FIG. 4D illustrates the cam 300 in a third intermediate position, and FIG. 4E illustrates the cam 300 in the open position. The cam 300 is in the first intermediate position when the angle of rotation 402 is between about 12 and 23 degrees, in the second intermediate position when the angle of rotation 402 is between about 30 and 40 degrees, in the third intermediate position when the angle of rotation 402 is between about 47 and 58 degrees, and in the closed position when the angle of rotation 402 is between about 65 and 75 degrees. In the illustrated examples of FIGS. 4A-4E, the angle of rotation 402 is about 17.5 degrees in the first intermediate position, about 35 degrees in the second intermediate position, about 52.5 degrees in the third intermediate position, and about 70 degrees in the open position. The above-noted angles are merely an example of the cam disclosed herein and, thus, other angles may be used without departing from the scope of this disclosure.

As illustrated in FIG. 4C, the outer surface 302 of the cam 300 engages a surface 404 of a stem assembly or apparatus 406 at a contact surface 408. The contact surface 408 moves between the first portion 304 and the second portion 306 of the outer surface 302 as the cam 300 rotates about the axis of rotation 322. As illustrated in FIG. 4C, a first distance 410 is defined between the axis of rotation 322 and a first axis 412 that extends through the contact surface 408 and is parallel to a longitudinal axis 414 of the stem apparatus 406. The first distance 410 varies as the cam 300 rotates between the close position and the open position. A second distance 416 of the illustrated example is defined between the axis of rotation 322 and a second axis 418 that extends through the contact surface 408 and is perpendicular the first axis 412. Rotation of the cam 300 from the open position to the closed position causes the distance 416 to increase as the cam 300 causes the stem apparatus 406 to move away from the axis of rotation 322 of the cam 300.

As illustrated in FIG. 4A, the first portion 304 of the outer surface 302 of the cam 300 is adjacent the surface 404 of the stem apparatus 406 when the cam 300 is in the closed position. As the cam 300 transitions from the closed position (FIG. 4A) to the open position (FIG. 4E), the cam 300 engages the surface 404 of the stem apparatus 406 when the cam is in the first intermediate position of FIG. 4B. The contact surface 408 moves away from the first portion 304 of the outer surface 302 as the cam 300 continues to transition to the open position. For example, the third portion 308 of the outer surface 302 engages the surface 404 of the stem apparatus 406 when the cam 300 is in the first and/or second intermediate position. In the third intermediate position, the fourth portion 310 of the outer surface 302 engages the surface 404 of the stem apparatus 406. When the cam 300 is rotated to the open position, the second portion 306 of the outer surface 302 engages the surface 404 of the stem apparatus 406.

As illustrated in FIGS. 4A-4E, the contact surface 408 moves away from the second portion 306 of the outer surface 302 as the cam 300 transitions from the open position (FIG. 4E) to the first intermediate position (FIG. 4B). For example, the second portion 306 disengages from the surface 404 of the stem apparatus 406 as the cam 300 rotates from the open position. The second portion 306 and the fourth portion 310 of the outer surface 302 form an obtuse angle (e.g., about a 172 degree angle) that prevents the cam 300 from inadvertently jamming and/or locking into the open position and, thus, enables the cam 300 to rotate from the open position to the third intermediate position. As the cam 300 continues to transition to the closed position, the cam 300 is rotated such that the curved third portion 308 of the outer surface 302 engages the surface 404 of the stem apparatus 406. The reduced radius of curvature of the curved profile of the third portion 308 causes the angular rotation of the cam 300 to accelerate as the contact surface 408 transitions along the third portion 308 to overcome resistive forces that would otherwise prevent the cam 300 from fully rotating to the closed position. As illustrated in FIG. 4A, the first portion 304 of the outer surface 302 rests adjacent the surface 404 of the stem apparatus 406 when the cam 300 is oriented in the closed position.

Figure 6:
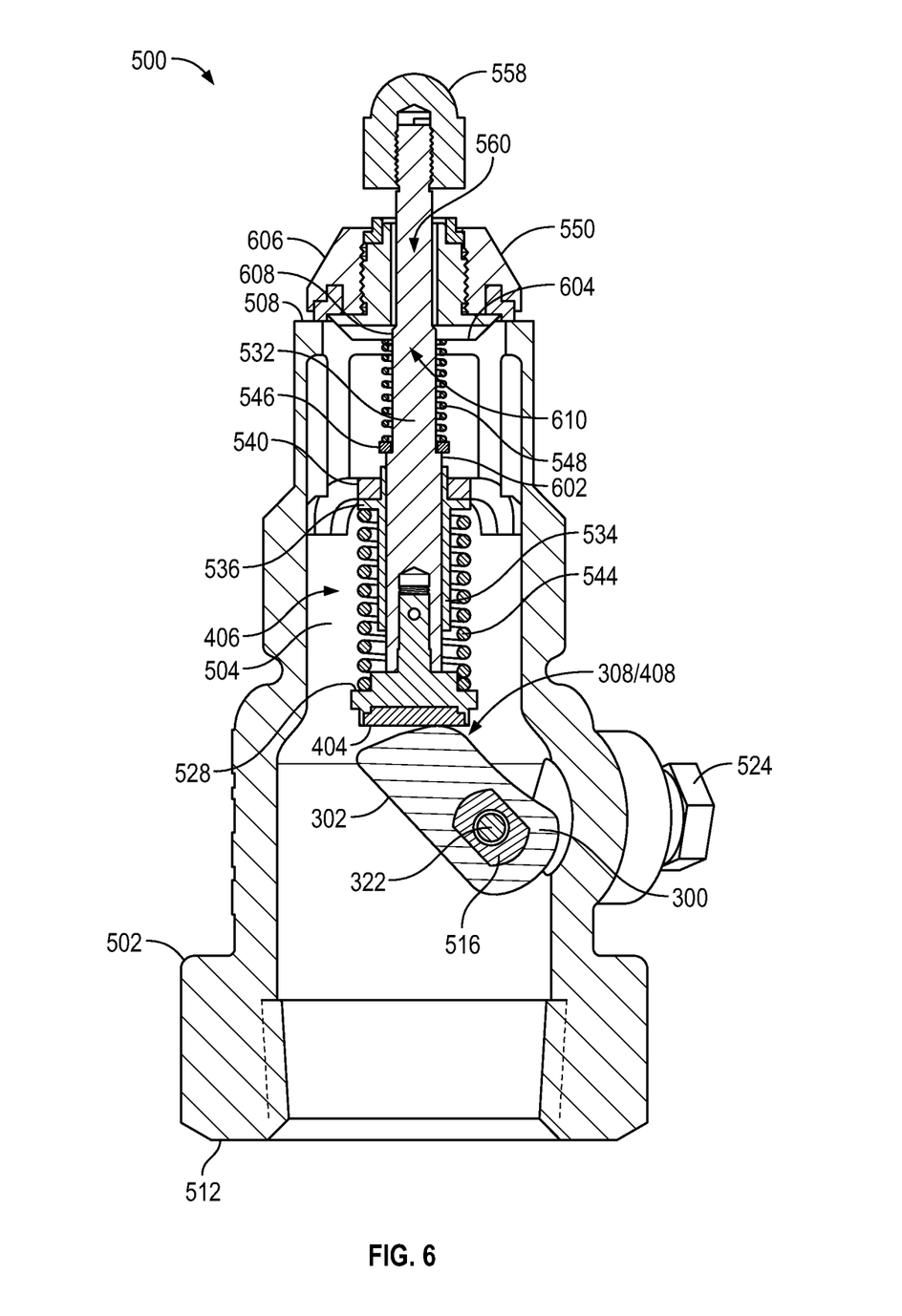
FIG. 6 depicts a cross-sectional view of the example internal valve of FIG. 5 and the example cam of FIGS. 3A-4E in a bleed position.
Figure 7:
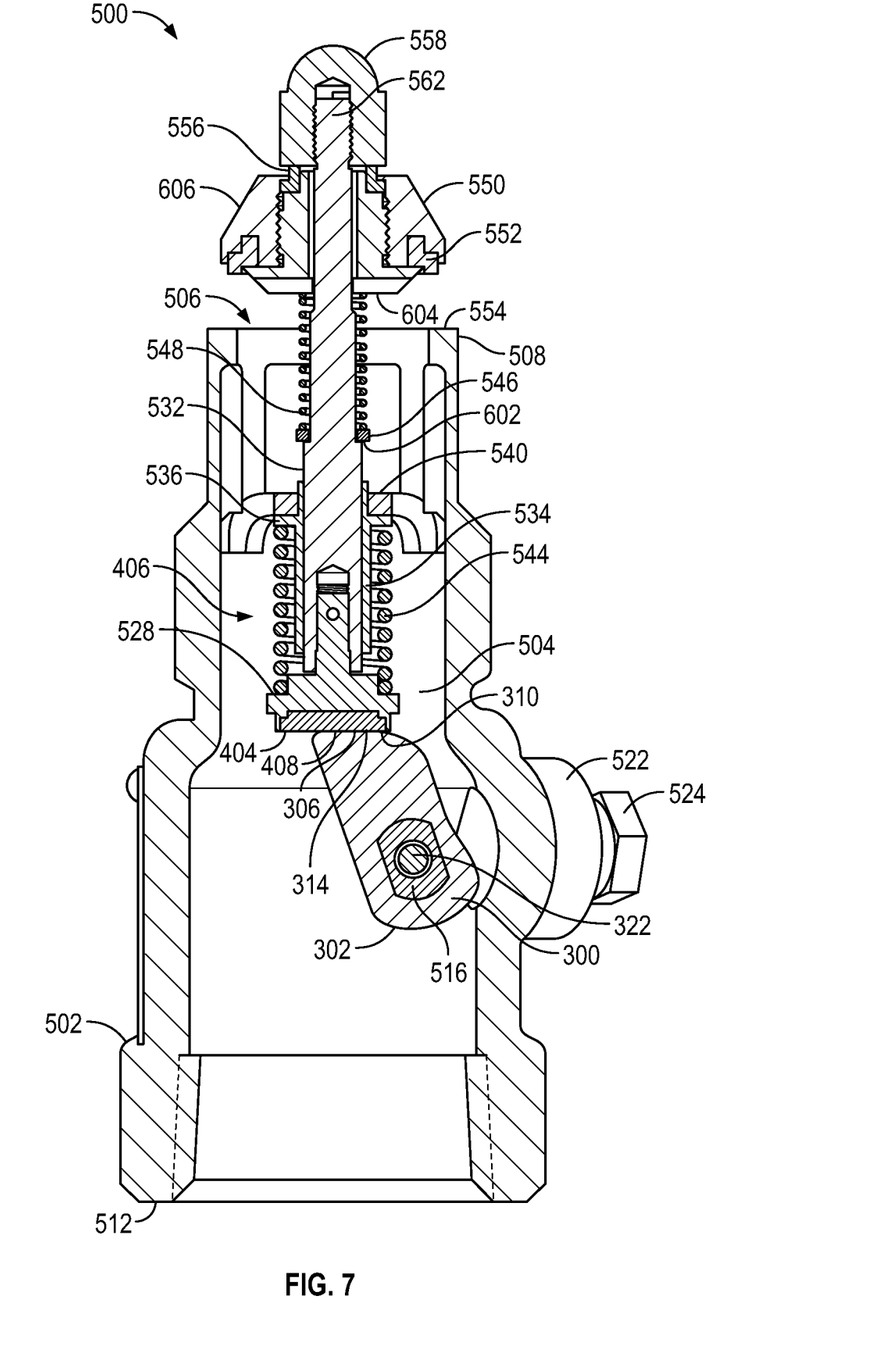
FIG. 7 depicts a cross-sectional view of the example internal valve of FIGS. 5-6 and the example cam of FIGS. 3A-4E in the open position.

FIGS. 5-7 illustrate the example cam 300 within an example internal valve 500. In particular, FIG. 5 shows the internal valve 500 in the closed position, FIG. 6 shows the internal valve 500 in a bleed position, and FIG. 7 shows the internal valve 500 in the open position.

As illustrated in FIG. 5, the internal valve 500 includes a body 502 defining a bore or chamber 504, a first opening 506 adjacent a first end 508, and a second opening 510 adjacent a second end 512 opposite the first end 508. The chamber 504 of the internal valve 500 fluidly couples a first chamber or tank received by the first end 508 of the body 502 and a second chamber or tank received by the second end 512 of the body 502.

As illustrated in FIG. 5, the cam 300 is coupled to a first end 514 of a shaft 516 of a gland assembly 518 via a cap 520. The gland assembly 518 is coupled to the body 502 of the internal valve 500. In the illustrated example, the aperture 320 of the cam 300 receives the first end 514 of the shaft 516. For example, the first end 514 of the shaft 516 defines a profile that matches the profile of the aperture 320 of the cam 300 to ensure that the cam 300 is positioned at a desired orientation relative to the shaft 516. As illustrated in FIG. 5, the first end 514 of the shaft 516 defines a profile that matches the linear edges 324 and the curved edges 326 of the aperture 320 of the cam 300.

The shaft 516 is rotatably coupled to a gland 522 of the gland assembly 518 and is partially positioned within the gland 522. The shaft 516 is composed of, for example, a metallic material such as stainless steel or carbon steel. Spacers (e.g., the spacers 126 of FIG. 1) are positioned within the gland 522 of the illustrated example and surround the shaft 516 to form a seal between the shaft 516 and the gland 522. For example, as the temperature and/or pressure within the opening of the gland 522 increases, the spacers expand against the gland 522 and/or the shaft 516 to further tighten the seal formed between the gland 522 and the shaft 516. In contrast, the spacers contract away from the gland 522 and/or shaft 516 as the temperature and/or the pressure within the gland 522 decreases. To ensure that a tight seal is formed between the gland 522 and the shaft 516 in low temperature (e.g., −40 degrees Celsius) and/or low pressure environments, the spacers are composed of a plastic material such as polyxymethylene (e.g., delrin) and are sized to engage both the gland 522 and the shaft 516 when contracted. As a result, the spacers may create packing forces that resist and/or obstruct rotation of the shaft 516 relative to the gland 522. Further, the spacers of the illustrated example are positioned between washers (e.g., the washers 128 of FIG. 1) and a spring (e.g., the spring 130 of FIG. 1) within the opening of the gland 522 to further tighten the seal formed between the shaft 516 and the gland 522. For example, the washers are composed of a metal such as stainless steel or steel, and the spring of the gland assembly 518 is composed of a metal such as stainless steel or steel.

As illustrated in FIG. 5, an external lever 524 is coupled to a second end 526 of the shaft 516 opposite the first end 514 to enable a user to rotate the shaft 516 relative to the gland 522. Because the cam 300 is coupled to the shaft 516, the cam 300 rotates as the user rotates the shaft 516 via the external lever 524. As the cam 300 rotates, the outer surface 302 of the cam 300 engages the surface 404 of the stem apparatus 406 to cause the stem apparatus 406 to move in a rectilinear path within the chamber 504 of the internal valve 500.

In the illustrated example, the surface 404 of the stem apparatus 406 is adjacent the cam 300 in the closed position. A first spring seat 528 of the stem apparatus 406 of the illustrated example is coupled to a first end 530 of a stem 532. As illustrated in FIG. 5, the stem apparatus 406 includes a stem guide 534 that surrounds a portion of the stem 532 and defines a second spring seat 536 opposite the first spring seat 528. As illustrated in FIG. 5, a surface 538 of the stem guide 534 engages a guide bracket 540. For example, the guide bracket 540 defines an opening 542 to guide the stem 532 as the stem 532 moves in a rectilinear path relative to the body 502 of the internal valve 500. A first spring 544 of the stem apparatus 406 is positioned between the first spring seat 528 and the second spring seat 536.

The stem apparatus 406 of the illustrated example includes a third spring seat 546 that surrounds a portion of the stem 532 and engages the stem guide 534 in the closed position. As illustrated in FIG. 5, the stem apparatus 406 includes a second spring 548 that is positioned between the third spring seat 546 and a poppet 550. A shut-off disc or seal 552 is coupled to the poppet 550 and sealingly engages a surface 554 of the body 502 in the closed position to prevent fluid flow through the first opening 506 of the internal valve 500. As illustrated in FIG. 5, a bleed disc or seal 556 is coupled to the poppet 550 and engages a plug 558 of the stem apparatus 406 in the closed position to prevent fluid flow through an aperture 560 of the poppet 550. The plug 558 is coupled to a second end 562 of the stem 532 opposite the first end 530. The stem 532 extends through the aperture 560 of the poppet 550 to enable the second end 562 to be coupled to the plug 558.

FIG. 6 illustrates the internal valve 500 in the bleed position. To transition the internal valve 500 from the closed position of FIG. 5 to the bleed position of FIG. 6, the cam 300 is rotated about the axis of rotation 322 in a clockwise direction. For example, the cam 300 is rotated as a result of the user rotating the shaft 516 via the external lever 524.

As the internal valve 500 transitions from the closed position to the bleed position, the outer surface 302 of the cam 300 engages the surface 404 of the stem apparatus 406 and pushes and/or urges the stem apparatus 406 away from the axis of rotation 322 of the cam 300. For example, the stem 532 of the stem apparatus 406 moves in a rectilinear path away from the second end 512 of the body 502. As illustrated in FIG. 6, the stem guide 534 remains stationary as the stem 532 moves in a rectilinear path away from the second end 512. As a result, the first spring 544 positioned between first spring seat 528 and the second spring seat 536 compresses. An edge 602 of the stem 532 of the illustrated example moves toward the first end 508 of the body 502 and engages the third spring seat 546 of the stem apparatus 406. For example, the edge 602 of the stem 532 urges the third spring seat 546 in a rectilinear path toward the first end 508 of the body 502. Because the poppet 550 of the illustrated example remains engaged with the body 502 in the bleed position, the third spring seat 546 compresses the second spring 548 as the internal valve 500 transitions from the closed position to the bleed position.

In the illustrated example, the cam 300 is rotated about 35 degrees in a clockwise direction relative to the closed position (e.g., rotated to the second intermediate position of FIG. 4C) when the internal valve is in the bleed position. The above-noted angle is merely one example of the cam 300 in the bleed position as disclosed herein and, thus, other angles may be used without departing from the scope of this disclosure. As illustrated in FIG. 6, the third portion 308 of the outer surface 302 of the cam 300 engages the surface 404 of the stem apparatus 406. In other words, the contact surface 408 is located at the third portion 308 of the outer surface 302 when the internal valve 500 is in the bleed position. As illustrated in FIG. 6, the first spring 544 is compressed in the bleed position as a result of the stem guide 534 remaining engaged with the guide bracket 540 of the body 502 and the cam 300 urging and/or pushing the first stem seat 528 toward the first end 508.

When the internal valve 500 is in the bleed position, a force exerted by the compressed second spring 548 on an interior surface 604 of the poppet 550 is less than a force exerted on an exterior surface 606 of the poppet 550 by fluid exterior to the internal valve 500. As a result of the poppet 550 remaining engaged with the body 502, the second spring 548 is compressed in the bleed position. As illustrated in FIG. 6, the plug 558 is disengaged from the poppet 550 when the internal valve 500 is in the bleed position. As a result, fluid is enabled to flow into and/or out of the chamber 504 of the internal valve 500 via the opening 560 of the poppet 550. For example, a chamfered edge 608 of the stem 532 is adjacent an inlet 610 of the opening 560 of the poppet 550 when the internal valve 500 is in the bleed position. The proximity of the chamfered edge 608 relative to the opening 560 limits fluid flow through the opening 560 of the poppet 550, thereby limiting fluid to bleed into and/or out of the chamber 504 via the opening 560.

To remain in the bleed position as illustrated in FIG. 6, a force exerted on the stem apparatus 406 by the cam 300 via the user is substantially equal to a force exerted on the cam 300 by the stem 532 via the compressed first spring 544. For example, the internal valve 500 transitions away from the bleed position and further toward the open position when a force exerted on the stem 532 by the cam 300 exceeds the compressive force of the first spring 544.

FIG. 7 illustrates the internal valve 500 in the open position. To transition the internal valve 500 to the open position, the cam 300 is further rotated about the axis of rotation 322 in a clockwise direction. For example, the user rotates the shaft 516 via the external lever 524 to cause the cam 300 to rotate about the axis of rotation 322.

As the internal valve 500 transitions to the open position, the outer surface 302 of the cam 300 continues to push and/or urge the stem apparatus 406 away from the second end 512 of the body 502. As illustrated in FIG. 7, the stem guide 534 remains stationary as the stem 532 continues to move in a rectilinear path away from the second end 512. As a result, the first spring 544 positioned between the first spring seat 528 and the second spring seat 536 is further compressed. The edge 602 of the stem 532 of the illustrated example continues to engage the third spring seat 546 of the stem apparatus 406 and urge and/or push the third spring seat 546 toward the first end 508 of the body 502. For example, the force exerted on the interior surface 604 of the poppet 550 by the second spring 548 is greater than the force exerted by fluid on the exterior surface 606 of the poppet 550, thereby enabling the second spring 548 to decompress and push and/or urge the poppet 550 to engage the plug 558.

When the internal valve 500 is in the open position, the second portion 306 of the outer surface 302 of the cam 300 engages the surface 404 of the stem apparatus 406 such that the contact surface 408 is at the second portion 306 of the outer surface 302. As illustrated in FIG. 7, the cam 300 is rotated about 70 degrees in a clockwise direction relative to the closed position (e.g., the closed position of FIG. 4E) when the cam 300 is in the open position. Further, the first spring 544 is compressed and the second spring 548 is decompressed when the internal valve 500 is in the open position. As a result, fluid is permitted to flow into and/or out of the chamber 504 via the first opening 506 of the internal valve 500. The above-noted angle is merely one example of the cam in the open position as disclosed herein and, thus, other angles may be used without departing from the scope of this disclosure.

When the internal valve 500 is in the open position as illustrated in FIG. 7, the cam 300 exerts a force on the stem apparatus 406 that is greater than the force that the compressed first spring 544 exerts on the stem 532. Further, the force exerted by the second spring 548 on the interior surface 604 of the poppet 550 is greater than or substantially equal to the force exerted by fluid on the exterior surface 606. If the force exerted by the second spring 548 becomes less than the force exerted on the exterior surface 606 by the fluid, the internal valve 500 moves to a limited bleed position. When the internal valve 500 is in the limited bleed position, the bleed disc 556 of the poppet 550 is disengaged from the plug 558 and the shut-off disc 552 of the poppet 550 engages the surface 554 of the body 502. Relative to when the internal valve 500 is in the bleed position, the chamfered edge 608 of the stem 532 is positioned closer to the inlet 610 of the poppet 550 and, thus, further limits the flow of fluid through the opening 560.

To transition the internal valve 500 from the open position to the closed position, the cam 300 is rotated about the axis of rotation 322 in a counterclockwise direction. The cam 300 rotates in the counterclockwise position as a result of the first spring 544 causing the stem apparatus 406 to apply a torque to the cam 300 about the axis of rotation 322. As illustrated in FIG. 7, the second portion 306 and the fourth portion 310 of the outer surface 302 of the cam 300 form an obtuse angle (e.g., about 172 degrees) at the edge 314. The angle formed at the edge 314 prevents the cam 300 from inadvertently jamming and/or locking in the open position and, thus, enables the cam 300 to rotate counterclockwise from the open position as the stem apparatus 406 applies a torque to the cam 300 about the axis of rotation 322. For example, if the second portion 306 and the fourth portion 310 were substantially parallel such that no edge were defined between the second and fourth portions 306, 310, the second and fourth portions 306, 310 would form an extended flat surface that may prevent the cam 300 from rotating from the open position as the stem apparatus 406 applies a force to the cam 300.

As the cam 300 rotates, the first spring 544 urges and/or pushes the stem 532 in a direction toward the second end 512 of the body 502 such that the surface 404 of the stem apparatus 406 continues to engage the outer surface 302 of the cam 300. Movement of the stem 532 toward the second end 512 of the body 502 causes the plug 558 coupled to the second end 562 of the stem 532 to move toward the second end 512 of the body 502. In turn, the plug 558 engages the bleed disc 556 of the poppet 550 and urges and/or pushes the poppet 550 until the shut-off disc 552 of the poppet 550 engages the surface 554 of the body 502. The cam 300 continues to rotate counterclockwise and the stem apparatus 406 continues to slide toward the second end 512 of the body 502 until the internal valve 500 reaches the closed position as illustrated in FIG. 5.

The profile of the cam 300 enables the shaft 516 of the internal valve 500 to overcome resistance resulting from the packing forces in low temperature and/or low pressure environments and, thus, enables the shaft 516 to fully rotate to the closed position.

In some examples, the profile of the cam 300 increases the linear displacement of the stem apparatus 406 when the cam 300 engages the surface 404 of the stem apparatus 406. The increased displacement of the stem apparatus 406 causes the first spring 544 to further compress which, in turn, causes the first spring 544 to exert an increased force on the cam 300. The increased force exerted by the first spring 544 on the cam 300 enables the shaft 516 to overcome the resistive packing forces of the spacers within the gland 522.

In some examples, the curved profile of the third portion 308 of the cam 300 defines a small radius of curvature that causes the cam 300 to angularly accelerate as the cam 300 rotates from the open position of FIG. 7 to the closed position of FIG. 5. The angular acceleration increases angular momentum of the cam 300 and, thus, the stem 516 when the cam 300 disengages from the surface of the stem apparatus 406 and continues to rotate to the closed position of FIG. 3A. As a result, the curved profile of the third portion 308 of the cam 300 enables the shaft 516 to overcome the resistive packing forces applied within the gland 522 as the cam 300 approaches the closed position.

Figure 10:
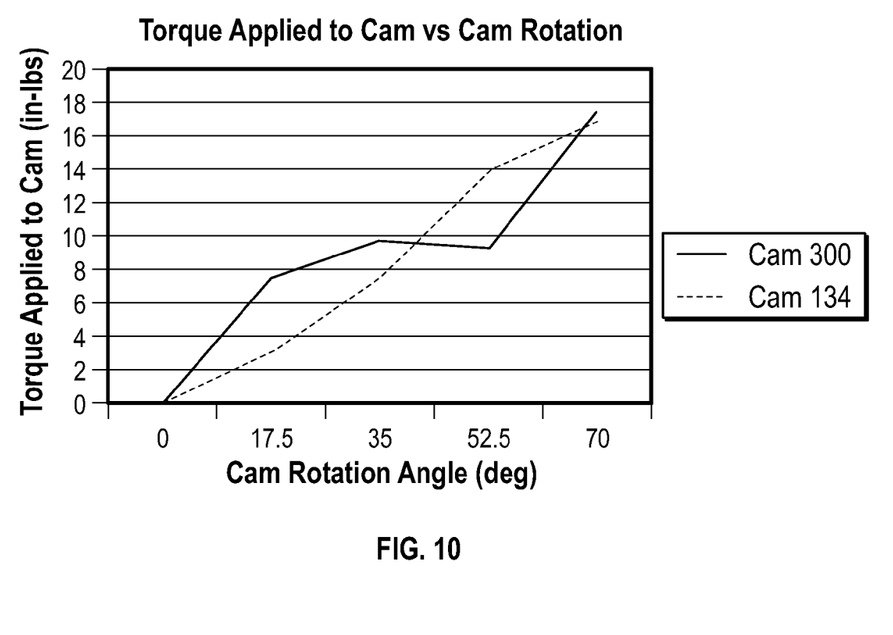
FIG. 10 is a graph depicting torque versus rotation of the known cam of FIG. 2 and the example cam of FIGS. 3A-4E.

In some examples, the profile of the cam 300 increases the torque applied on the cam 300 by the stem apparatus 406 when the cam 300 is between the bleed position and the closed position (FIG. 10). The increased torque applied to the cam 300 enables the shaft 516 to overcome the resistive packing forces applied within the gland 522 as the cam 300 disengages from the surface 404 of the stem apparatus 406 and rotates to the closed position.

Figure 8:
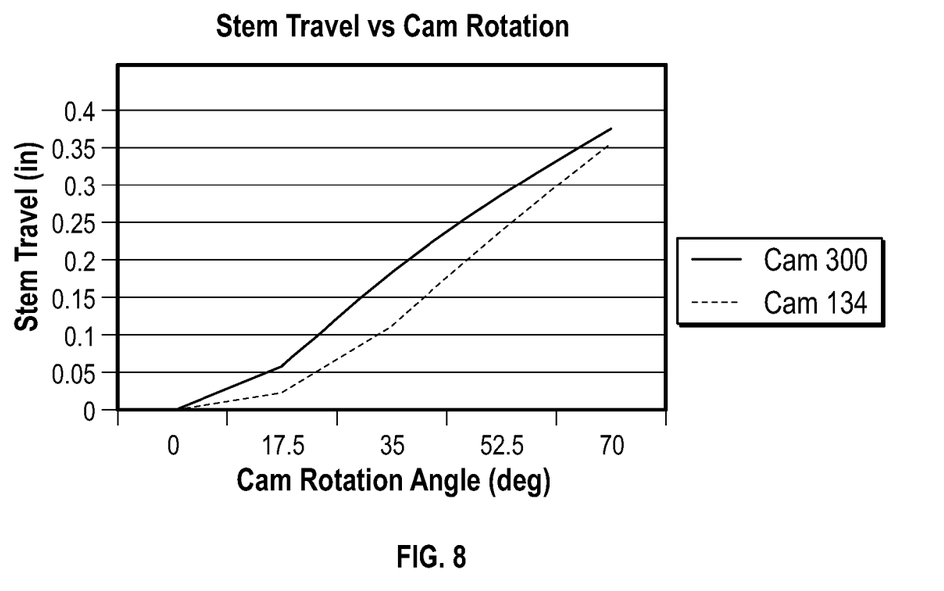
FIG. 8 is a graph depicting stem travel distance versus rotation of the known cam of FIG. 2 and rotation of the example cam of FIGS. 3A-4E.

As a result of the profile of the cam 300 enabling the cam 300 to overcome the resistive packing forces within the gland 522 and rotate fully to the closed position, the profile of the cam 300 enables the stem apparatus 406 to fully transition along a rectilinear path to the closed position. In turn, a tight seal is formed between the shut-off disc 552 of the plug 550 and the surface 554 of the body 502 in low temperature and/or low pressure environments to prevent fluid from leaking through the internal valve 500. FIG. 8 is a graphical representation of a stem travel distance that corresponds to the cam 300 (represented by a solid line) and the known cam 134 (represented by a dashed line) versus the rotational angles of the corresponding cams 134, 300.

As illustrated in FIG. 8, the cam 300 causes the stem 532 to travel greater distances at any angular position. The stem travel distance corresponds to the second distance 416 (FIG. 4C) of the cam 300 such that an increase of the second distance 416 corresponds to an increase in the stem travel distance.

Table 1 provided below includes data of the second distance 220, 416 for the respective cams 134, 300 and the corresponding stem travel distances when the cams 134, 300 is oriented at various angles.

TABLE 1

| Cam Angle (degrees) | Second Distance 220 (inches) of Known Cam 134 | Second Distance 416 (inches) of Cam 300 | Stem Travel (inches) Known Cam 134 | Stem Travel (inches) Cam 300 |
|---|---|---|---|---|
| 0 | 0.325 | 0.325 | 0 | 0 |
| 17.5 | 0.3484 | 0.3837 | 0.0234 | 0.0587 |
| 35 | 0.436 | 0.5092 | 0.111 | 0.1842 |
| 52.5 | 0.5647 | 0.6111 | 0.2397 | 0.2861 |
| 70 | 0.68 | 0.7 | 0.355 | 0.375 |

Both Table 1 and FIG. 8 illustrate that the profile of the cam 300 increases the stem travel distance at any given cam angle orientation relative to the known cam. For example, the cam 300 increases the stem travel distance relative to the cam 134 when each cam 134, 300 is at about 17.5 degrees of rotation (e.g., between the closed position and the bleed position, the first intermediate position), at about 35 degrees of rotation (e.g., the bleed position, the second intermediate position), at about 52.5 degrees of rotation (e.g., between the bleed position and the open position, the third intermediate position), and at about 70 degrees of rotation (e.g., the open position). In some examples, the stem travel of the cam 300 in the open position relative to the closed position is at least 0.36 inches. Because an increase in the travel distance of the stem 532 results in an increase of the force exerted by the first spring 544 on the cam 300, the profile of the cam 300 increasing the travel distance of the stem 532 enables the shaft 516 to overcome resistive packing forces to rotate to the closed position and, thus, helps the internal valve 500 to form a tight seal in the closed position.

Figure 9:
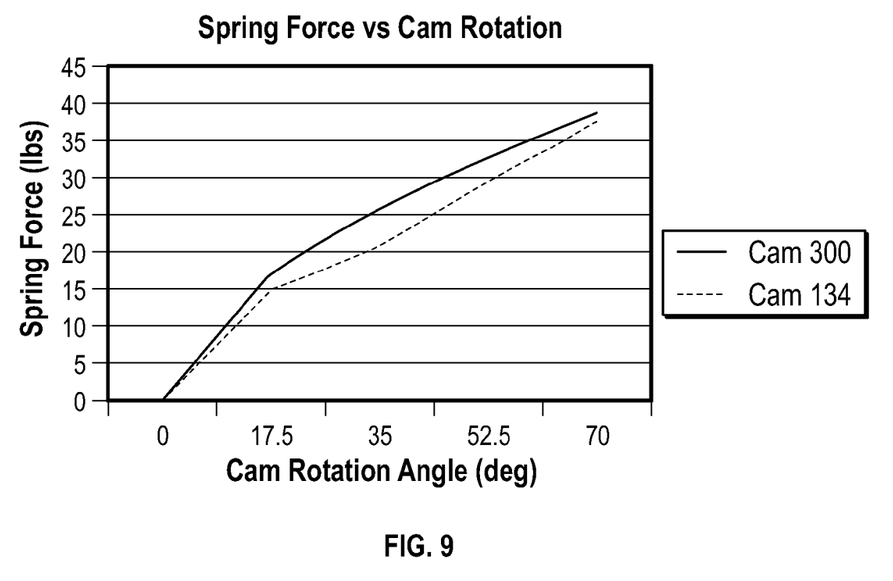
FIG. 9 is a graph depicting a force exerted by a spring versus rotation of the known cam of FIG. 2 and rotation of the example cam of FIGS. 3A-4E.

FIG. 9 is a graphical representation of a force exerted by the first spring 144, 544 versus the orientation of the corresponding cam 300 (represented by a solid line) and the known cam 134 (represented by a dashed line) at various angles of rotation.

The profile of the cams 134, 300 affects the force exerted by the respective first spring 144, 544, because the force exerted by each first spring 144, 544 corresponds to the compression of the first spring 144, 544 and the compression of each first spring 144, 544 corresponds to the travel distance of the stem 140, 532. Thus, because the profile of the cam 300 increases the travel distance of the stem 532 relative to the travel distance of the stem 140 as illustrated in FIG. 9, the profile of the cam 300 increases the force exerted by the first spring 544 relative to the force exerted by the first spring 144 as a result of the profile of the cam 134.

Table 2 provided below includes data of the travel distance of the stem 140, 532 and the force exerted by the corresponding first spring 144, 544 when the corresponding cams 134, 300 are oriented at various angles.

TABLE 2

| Cam Angle (degrees) | Stem Travel (inches) | | Spring Force (pounds) | |
|---|---|---|---|---|
| | Known Cam 134 | Cam 300 | Known Cam 134 | Cam 300 |
| 0 | 0 | 0 | — | — |
| 17.5 | 0.0234 | 0.0587 | 14.85 | 17.25 |
| 35 | 0.111 | 0.1842 | 20.81 | 25.79 |
| 52.5 | 0.2397 | 0.2861 | 29.56 | 32.71 |
| 70 | 0.355 | 0.375 | 37.4 | 38.76 |

Both Table 2 and FIG. 9 illustrate that, at each cam angle orientation, the cam 300 causes the force that the first spring 544 exerts to be greater than the force that the cam 134 causes the first spring 144 to exert. For example, the cam 300 causes the first spring 544 to exert a force greater than the force exerted by the first spring 144 when the internal valve 500 is at about 17.5 degrees of rotation (e.g., between the closed position and the bleed position, the first intermediate position), at about 35 degrees of rotation (e.g., the bleed position, the second intermediate position), at about 52.5 degrees of rotation (e.g., between the bleed position and the open position, the third intermediate position), and at about 70 degrees of rotation (e.g., the open position). In some examples, the force exerted by the first spring 544 is at least 38 pounds when the cam 300 is in the open position. In some examples, the force exerted by the first spring 544 is at least 16 pounds when the cam 300 is in the first intermediate position.

The increased force exerted by the first spring 544 on the cam 300 enables the shaft 516 to overcome the resistive packing forces of the spacers within the gland 522 and rotate fully to the closed position. As a result, the profile of the cam 300 enables the shut-off disc 552 of the plug 550 to form a tighter seal with the surface 554 of the body 502 in the closed position. Thus, the profile of the cam 300 prevents fluid from leaking through the internal valve 500 in low temperature and/or low pressure environments.

FIG. 10 is a graphical representation of a torque applied to the cam 300 (represented by a solid line) and the known cam 134 (represented by a dashed line) versus the orientation of the respective cam 134, 300 at various angles of rotation. The torque applied to the cam 300 corresponds to the force exerted by the first spring 544 and corresponds to the first distance 410 of the cam 300 defined between the axis of rotation 322 and the first axis 412 extending through the contact surface 408. Because the profile of the cam 300 increases both the first distance 410 and the force exerted by the first spring 544 as the cam 300 approaches the closed position, the profile of the cam 300 substantially increases the torque applied to the cam 300 by the stem 532 as the cam 300 approaches the closed position.

Table 3 provided below includes data of the first distance 216, 410 of the cam 134, 300 and the torque of the cam 134, 300 at the contact surface 210, 408 when the corresponding cam 134, 300 is oriented at various cam angles.

TABLE 3

| Cam Angle (degrees) | First Distance 216 (inches) of Known Cam 134 | First Distance 410 (inches) of Cam 300 | Torque Applied to Cam (inch-pounds) | |
|---|---|---|---|---|
| | | | Known Cam 134 | Cam 300 |
| 0 | — | — | — | — |
| 17.5 | 0.2096 | 0.3837 | 3.11 | 7.54 |
| 35 | 0.3597 | 0.378 | 7.48 | 9.72 |
| 52.5 | 0.4703 | 0.2218 | 13.91 | 9.28 |
| 70 | 0.45 | 0.45 | 16.83 | 17.43 |

Both Table 3 and FIG. 10 illustrate that, as the internal valve 500 transitions from about 35 degrees of rotation (e.g., the bleed position, the second intermediate position) to about 0 degrees of rotation (e.g., the closed position), the profile of the cam 300 substantially increases the torque applied to the cam 300 by the stem 532 relative to the torque applied to the cam 134 by the stem 140. In some example, the torque applied to the cam 300 is substantially increased relative to the torque applied to the cam 134 when each cam 134, 300 is at about 17.5 degrees of rotation (e.g., between the closed position and the bleed position, the first intermediate position) and at about 35 degrees of rotation (e.g., the bleed position, the second intermediate position). For example, the torque applied to the cam 300 by the stem 532 is at least 4 inch-pounds when the cam 300 is in the first intermediate position.

The torque applied to the cam 300 as the cam 300 approaches the closed position helps enable the shaft 516 to overcome resistive forces resulting from the packing forces within the gland 522. As a result, the increased torque caused by the profile of the cam 300 helps enable the poppet 550 to form a substantially tighter seal with the body 502 and helps enable the plug 558 to form a substantially tighter seal with the poppet 550 in the closed position in low temperature and/or low pressure environments.

Further, in some examples, the torque applied to the cam 300 in the closed position is greater than the torque applied to the cam 134 in the closed position. For example, the torque applied to the cam 300 by the stem 532 is at least 17 inch-pounds. In other words, the profile of the cam 300 does not cause the torque applied to the cam 300 in the open position to be less than the torque applied to the cam 134 in the open position.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
a cam having a cam surface to engage a valve stem;
a first portion of the cam surface to engage the valve stem in a closed position;
a second portion of the cam surface to engage the valve stem in an open position;
a third portion of the cam surface adjacent the first portion and defining a curved profile, the third portion to engage the valve stem when the cam is rotated to a first intermediate position between the closed position and the open position; and
a fourth portion of the cam surface between the second portion and the third portion and defining a linear profile, the fourth portion to engage the valve stem as the cam rotates between the first intermediate position and the open position, the fourth portion and the second portion form an angle of about 172 degrees to enable the curved profile of the third portion to have a radius of curvature that accelerates an angular rotation of the cam as the cam rotates to the closed position to overcome resistive forces.

2. The apparatus of claim 1, wherein the second portion defines a linear profile, the linear profile of the second portion being non-parallel to the linear profile of the fourth portion.

3. The apparatus of claim 2, further including an edge positioned between the second portion and fourth portion, the edge prevents jamming of the cam by enabling the second portion to disengage from the valve stem to enable the cam to rotate from the open position.

4. The apparatus of claim 1, wherein the cam surface is to engage the valve stem to cause the valve stem to move along a rectilinear path when the cam rotates.

5. The apparatus of claim 1, wherein the curved profile of the third portion is to cause the valve stem to accelerate along a rectilinear path as the cam rotates between the open first portion and the closed portion.

6. The apparatus of claim 1, wherein the angle and the radius of curvature enable a contact surface between the cam and the valve stem to be spaced apart from an axis of rotation of the cam by a distance at the first intermediate position to further accelerate the angular rotation of the cam as the cam rotates to the closed position to overcome the resistive forces.

7. An apparatus comprising:
a valve body defining a chamber and a gland;
a stem extending into the chamber of the valve body;
a shaft disposed in the gland of the valve body such that a seal is formed between the shaft and the gland, the shaft having an end that extends into the chamber of the valve body adjacent the stem; and
a cam coupled to the end of the shaft and defining an outer surface to engage an end of the stem, the outer surface having a first portion to engage the end of the stem in a closed position, a second portion to engage the end of the stem in an open position, a third portion adjacent the first portion and defining a curved profile that is to engage the end of the stem in a first intermediate position, a fourth portion between the second portion and the third portion and defining a linear profile that is to engage the end of the stem in a second intermediate position, the fourth portion and the second portion form an angle of about 172 degrees to enable the curved profile of the third portion to have a radius of curvature that accelerates an angular rotation of the cam as the cam rotates to the closed position to overcome resistive forces resulting from the seal.

8. The apparatus of claim 7, further including a cap to couple the cam to the end of the shaft.

9. The apparatus of claim 7, further including a poppet coupled to the stem that is to sealingly engage the valve body when the cam is in the closed position.

10. The apparatus of claim 7, further including a biasing member disposed in the chamber of the valve body, the biasing member compresses as the stem moves from the closed position to the open position.

11. The apparatus of claim 7, wherein the cam is rotated about 70 degrees relative to the closed position to cause the cam to be positioned in the open position.

12. The apparatus of claim 11, wherein the cam causes the stem to move at least 0.36 inches to compress a biasing member within the chamber as the cam rotates from the closed position to the open position, the biasing member to provide a force of at least 38 pounds when the cam is in the open position to urge the cam to rotate from the open position.

13. The apparatus of claim 7, wherein the cam is rotated about 17.5 degrees relative to the closed position when the cam is in the first intermediate position, the cam to cause the stem to compress a biasing member in the chamber when the cam is in the first intermediate position.

14. The apparatus of claim 13, wherein, to enable the cam to rotate to the closed position, the biasing member provides at least 16 pounds of force in the first intermediate position to overcome resistance resulting from the seal formed between the shaft and the gland.

15. The apparatus of claim 13, wherein, to enable the cam to rotate to the closed position, the stem applies at least 7 inch-pounds of torque to the cam in the first intermediate position to overcome resistance resulting from the seal formed between the shaft and the gland.

16. The apparatus of claim 7, wherein an axis of rotation of the cam is spaced apart from a longitudinal axis of the stem, the angle and the radius of curvature enable the cam to remain engaged to the end of the stem as the cam rotates about the axis of rotation between the first intermediate position and the open position.

17. The apparatus of claim 16, wherein the angle and the radius of curvature enable the cam to engage the end of the stem along the longitudinal axis at the first intermediate position, a distance between the axis of rotation of the cam and the longitudinal axis of the stem to enable the stem to apply at least 7 inch-pounds of torque to the cam in the first intermediate position to enable the came to overcome the resistive forces resulting from the seal.

18. An apparatus comprising:
means for transforming rotary motion of a shaft to linear motion of a stem, the means for transforming coupled to the shaft and to engage the stem to transform the rotary motion to linear motion, the means for transforming defining:
means to engage the stem in a closed position;
means to engage the stem in an open position;
means to engage the stem in a first intermediate position as the means for transforming rotates between the closed position and the open position, the means to engage the stem in the first intermediate position defining a curved profile and being adjacent the means to engage the stem in the closed position; and
means to engage the stem in a second intermediate position as the means for transforming rotates between the first intermediate position and the open position, the means to engage the stem in the second intermediate position defining a linear profile and being positioned between the means to engage the stem in the open position and the means to engage the stem in the closed position, the means to engage the stem in the second intermediate position and the means to engage the stem in the open position form an angle of about 172 degrees to enable the means to engage the stem in the first intermediate position to accelerate an angular rotation of the means for transforming to overcome resistive forces as the means for transforming rotates to the closed position.

19. The apparatus of claim 18, wherein the means to engage the stem in the second intermediate position enables the means for transforming rotary motion to rotate from the open position by enabling the means to engage the stem in the open position to disengage the stem.

20. The apparatus of claim 18, further including means for preventing fluid flow that is to sealingly engage a valve body when the means for transforming rotary motion is in the closed position.

* * * * *

UNITED STATES PATENT AND TRADEMARK OFFICE
CERTIFICATE OF CORRECTION

PATENT NO. : 9,581,228 B2
APPLICATION NO. : 14/506233
DATED : February 28, 2017
INVENTOR(S) : Nashery et al.

Page 1 of 1

It is certified that error appears in the above-identified patent and that said Letters Patent is hereby corrected as shown below:

In the Claims

- Column 15, Line 23 (Claim 5): delete "first" between "open" and "portion"

- Column 16, Line 34 (Claim 17): replace "came" with "cam" before "to overcome the"

Signed and Sealed this
Fifteenth Day of May, 2018

Andrei Iancu
*Director of the United States Patent and Trademark Office*